United States Patent
D'Souza et al.

(10) Patent No.: US 9,209,972 B2
(45) Date of Patent: *Dec. 8, 2015

(54) MEDIATOR DEVICE MONITORING AND CONTROLLING ACCESS TO ELECTRONIC CONTENT

(71) Applicant: PivotCloud, Inc., Sunnyvale, CA (US)

(72) Inventors: Roy Peter D'Souza, Belleview, WA (US); Lars Kuhtz, Seattle, WA (US)

(73) Assignee: PivotCloud, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/611,206

(22) Filed: Jan. 31, 2015

(65) Prior Publication Data

US 2015/0149780 A1 May 28, 2015

Related U.S. Application Data

(63) Continuation of application No. 14/171,682, filed on Feb. 3, 2014, now Pat. No. 8,976,967, which is a continuation of application No. 13/716,351, filed on Dec. 17, 2012, now Pat. No. 8,681,992, which is a (Continued)

(51) Int. Cl.
*H04L 9/00* (2006.01)
*H04L 9/32* (2006.01)
(Continued)

(52) U.S. Cl.
CPC .. *H04L 9/14* (2013.01); *H04L 9/08* (2013.01); *H04L 9/0825* (2013.01); *H04L 9/0833* (2013.01); *H04L 9/30* (2013.01); *H04L 2209/24* (2013.01)

(58) Field of Classification Search
CPC . H04L 9/0819; H04L 63/0428; H04L 63/065; H04L 9/32; H04L 9/3202; H04L 9/0861; H04L 9/08; H04L 9/30; H04L 9/3006; H04L 9/0816; H04L 9/06; H04L 9/14
USPC .............. 380/277–279, 283, 44, 45; 713/171, 713/189, 193
See application file for complete search history.

(56) References Cited

U.S. PATENT DOCUMENTS 6,195,751 B1 * 2/2001 Caronni et al. ................ 713/163
6,256,733 B1 * 7/2001 Thakkar et al. ................ 713/156

(Continued)

OTHER PUBLICATIONS

Van Dijk, Juels: On the Impossibility of Cryptoraphy Alone for Privacy-Preserving Cloud Computation, Usenix Hotsec10 2010.

(Continued)

*Primary Examiner* — Hosuk Song
(74) *Attorney, Agent, or Firm* — Brian R. Short

(57) ABSTRACT

Methods, systems and apparatuses for a mediator controlling access to an electronic content, are disclosed. One method includes receiving, by a mediator device of a mediator, a second share $SK_{G2}$ from an owner device, wherein a first share $SK_{G1}$ is provided to a member device of a member of a group by the owner device. Further, the mediator receives a request from the member for mediation, including the mediator receiving a dispatch of the header of the encrypted electronic content. Further, the mediator receives a request for mediation, including the mediator receiving a dispatch of the header of the encrypted electronic content from the member. Further, the mediator determines whether the member is eligible to decrypt the electronic content, if eligible, the mediator responding to the request for mediation with a member accessible header, wherein the member accessible header includes the header after application of $SK_{G2}$.

20 Claims, 11 Drawing Sheets

Related U.S. Application Data continuation-in-part of application No. 13/613,080, filed on Sep. 13, 2012, now abandoned.

(60) Provisional application No. 61/598,071, filed on Feb. 13, 2012.

(51) Int. Cl.
*H04L 9/14* (2006.01)
*H04L 9/08* (2006.01)
*H04L 9/30* (2006.01)

(56) References Cited

U.S. PATENT DOCUMENTS

| | | | | |
|---|---|---|---|---|
| 6,266,420 | B1* | 7/2001 | Langford et al. | 380/282 |
| 7,089,211 | B1* | 8/2006 | Trostle et al. | 705/51 |
| 8,681,992 | B2* | 3/2014 | D'Souza et al. | 380/277 |
| 8,976,967 | B2* | 3/2015 | D'Souza et al. | 380/277 |
| 2010/0169656 | A1 | 7/2010 | Yoshida et al. | |
| 2011/0119481 | A1 | 5/2011 | Auradkar et al. | |
| 2011/0145580 | A1 | 6/2011 | Auradkar et al. | |
| 2011/0145593 | A1 | 6/2011 | Auradkar et al. | |
| 2012/0096389 | A1 | 4/2012 | Flam et al. | |
| 2012/0221421 | A1 | 8/2012 | Hammad | |
| 2012/0278388 | A1 | 11/2012 | Chiu | |
| 2012/0321086 | A1 | 12/2012 | D'souza et al. | |
| 2012/0323750 | A1 | 12/2012 | Sivaramakrishnan et al. | |
| 2012/0324237 | A1 | 12/2012 | D'souza et al. | |

OTHER PUBLICATIONS

D'Souza, Jao, Mironov, Pandey: Publicly Verifiable Secret Sharing for Cloud-Based Key Management. Indocrypt 2011.
Boneh, Segev, Waters: Targeted malleability: homomorphic encryption for restricted computations. ACM 2012.
Dara: Cryptography Challenges for Computation in Public Clouds. IACR Eprint 2013.
Chen: CloudHKA: A Cryptographic Approach for Hierarchical Access Control in Cloud Computing. ANCS'13 2013.

* cited by examiner

MEDIATOR DEVICE MONITORING AND CONTROLLING ACCESS TO ELECTRONIC CONTENT

RELATED APPLICATIONS

This application is a continuation of U.S. patent application Ser. No. 14/171,682, filed Feb. 3, 2014, and entitled "Mediator Monitoring and Controlling Access to Electronic Content", which is a continuation of U.S. patent application Ser. No. 13/716,351, filed Dec. 17, 2012, and entitled "Monitoring and Controlling Access to Electronic Content", which is a continuation-in-part (CIP) of U.S. patent application Ser. No. 13/613,080, filed Sep. 13, 2012, and entitled "Providing Trustworthy Workflow Across Trust Boundaries" which claims priority to U.S. Provisional Patent Application No. 61/598,071, filed Feb. 13, 2012, and entitled "High-Scale and Distributed Business and Consumer Networks," all of which are incorporated herein by reference.

FIELD OF THE DESCRIBED EMBODIMENTS

The described embodiments relate generally to electronic communication through cloud networks. More particularly, the described embodiments relate to methods, systems and apparatuses for a mediator monitoring and controlling access to electronic content.

BACKGROUND

A trust boundary in an electronic network is defined as a region within which all computer systems, their operations, and the data are trusted. Typically, a trust boundary is protected by computer security hardware and software such as firewalls, Virtual Private Networks (VPNs), intrusion detection and prevention systems, data leakage protections, anti-virus programs, etc. For example, for an organization, a trust boundary may include an entire data center infrastructure, including computers connected via VPNs. For an individual, a laptop computer could be her trust boundary.

Various mechanisms exist today to facilitate secure communications between trust boundaries. SSL/TLS and IPSec are two examples. These mechanisms are intrinsically point-to-point, thus for many-to-many secure information sharing and collaboration, it will require a worst case "N-squared messy cross-bar" connectivity for all N trust boundaries where every party needs to be able to field electronic communications from every other party. This can become costly and complex.

On the other hand, Web based technologies, and now cloud computing make information sharing and collaboration increasingly cheaper and easier. In essence, this is a central intermediary based hub-spoke communication model. When it comes to secure sharing, this model requires that the central intermediary to be a trusted escrow that must be trusted by all parties across all trust boundaries in the network and that no one in the network will surreptitiously game the system for their own profit.

Such a blind trust hub-spoke model tends to fail due to a range of challenges that include breaches of hub's electronic perimeters, insider attacks, coercion from governments and organized crimes, and other threats to the hub. All indications are that any model that involves conventional electronic security, and is based on a need to trust any central individual or organization to follow the rules, is deeply flawed. This is demonstrated by the fact that even with improvements in technologies for monitoring and protection, the rate of successful intrusions and internal malfeasance is actually rising rapidly.

In present day enterprises, the custodian (typically the hub, the infrastructure service operator/provider in physical possession of the sensitive data) and the curator (typically some spoke, the IT organization that owes and authorizes access to this data) are within the same organization, and most likely within the same legal and compliance domain. Authentication is typically implemented through techniques such as Kerberos and Open ID; authorization is typically through infrastructure such as AD and Security Groups; access control is enforced by the various data containers that include databases, document management systems, and networked file systems. Organizations also leverage PKI and X.509v3 for identity through Smart Cards, SAML/WS-Trust/WS-Federation for single sign-on and federation of authorization. Various technologies and solutions exist for the organization to implement its own Authentication and Authorization, and to federate beyond that organization with business partners and other service providers or service consumers.

When IT infrastructures such as data storage or containers are moved to a hosting service in the cloud, the role of the custodian and curator is separated, where the cloud service provider that is hosting the data is now the custodian of that data, while the curatorship continues to remain in the hands of functionaries within that organization. For legal, compliance and other business IP protection reasons, organizations can't afford the blind trust on the cloud service providers, thus are disinclined to adopt these services, or they demand unlimited liability protection.

In order to solve this problem, the cloud needs to be constrained in function to be only a policy enforcement service that is implementing the exact policy specified by the customer organization and its curator functionary. Furthermore, this new cloud architecture needs to seamlessly integrate, without any significant requirement to modify the existing IT infrastructure, or the existing business process.

Typically for an individual, business or other organization that is regulated, it is an option for them to outsource their IT, but it is not an option for them to outsource their risk. In the case of negligence or maleficence on the part of a service provider (hub), the risks to the individual or organization could be significant. As a consequence, organizations and businesses require significant liability protection from the service provider. This would transfer the risk to the hub, which could exacerbate that organization's own risk since it could be subject to negligence or maleficence on the part of their own employees, or coercion from governments, or intrusions by hackers.

In short, there is no solution existing today that can allow organizations and individuals (curators) to extend the existing IT infrastructures along with the business processes (such as Governance, Risk Management, and Compliance, GRC in short) to the cloud service providers (custodians), across the trust boundaries while a) the data privacy and confidentiality are ensured—custodians can never see the sensitive data nor the policies about how the data can be accessed; b) the visibility into, and the control over access to, or modification of the data are fully retained by the curators; and c) multiple curators across trust boundaries can collaborate and share the sensitive data through the custodians.

There is a need for systems, methods and apparatuses that address the above-listed requirements in cloud computing, and provide a trustworthy workflow across trust boundaries between parties.

A trustworthy workflow is defined as a cryptography-based mechanism that enables all parties to securely communicate across trust boundaries through the central intermediary (the hub), without the hub ever being able to access the data, nor the data access policies. All end-points in such a workflow can count on the same degree of trustworthiness of a point-to-point secure communications supported by protocols such as SSL/TSL and IPSec, as described before.

In addition, for a geo-distributed solution, there are technical, geo-political or legal reasons why a single trustworthy hub would not be sufficient. The technical reasons might include performance; the geo-political reasons might include governments that desire to suppress collaboration or commerce for sovereign reasons; the legal reasons might include the inefficiency of settlement, reconciliation, litigation and arbitrage across distinct legal boundaries. For that reason, it is necessary to have a federation of trustworthy hubs in disparate regions that can collaborate to provide the same trustworthiness, but with a greater degree of resilience, lower latencies and higher scale.

It is desirable to have methods, systems and apparatuses for monitoring and controlling access to an electronic content.

SUMMARY

An embodiment includes a method of a mediator monitoring and controlling access to an electronic content. The method includes receiving, by a mediator device of a mediator, a second share $SK_{G2}$ from an owner device, wherein a first share $SK_{G1}$ is provided to a member device of a member of a group by the owner device, wherein the group is created by the owner device generating a group public key $PK_G$ and a group secret key $SK_G$, wherein the member is added by the owner device to the group by generating the first share $SK_{G1}$ from the group secret key $SK_G$ and a public key of the member, and the second share $SK_{G2}$ from the group secret key $SK_G$ and a public key of the mediator, wherein a user publishes an electronic content for the group, comprising the user encrypting the electronic content to the group public key $PK_G$, wherein the electronic content includes a header and a payload, and wherein the member obtains the encrypted electronic content. The method further includes the mediator receiving a request from the member for mediation, comprising the mediator receiving a dispatch of the header of the encrypted electronic content, the mediator receiving a request, by the member, for mediation, comprising the mediator receiving a dispatch of the header of the encrypted electronic content from the member.

Other aspects and advantages of the described embodiments will become apparent from the following detailed description, taken in conjunction with the accompanying drawings, illustrating by way of example the principles of the described embodiments.

DETAILED DESCRIPTION

The described embodiments include methods, systems and apparatuses for providing for monitoring and control of access to an electronic content.

At least one benefit of the described embodiments includes the ability for individuals and organizations to leverage the benefits of clouds and other networks, which include lower costs, higher scale, and geo-distribution, in order to maximize their own efficiencies that might include lower capital and operational expenses.

There exist several collaboration and commerce networks that can benefit from the lower costs, scale and geo-distribution of clouds. These networks include supply and demand chains, and international trade. In the present day there is a precise support system that includes banks, escrow parties, shipping corporations, and mediation. However these do not scale for electronic commerce, when it is necessary for a human to be a mandatory intermediary for any typical transaction (as opposed to a human needing to get involved in the case of an error or a conflict).

Due to the replacement of that the previously described "messy crossbar" with a trustworthy hub, it is now easier for diverse technologies and solutions to integrate and inter-operate, since each spoke needs to perform a one-time integration with the trustworthy hub. In addition, it is possible for the hub to present a variety of interfaces to the spokes, and then perform the routing and inter-operation within the hub. In deployment scenarios with multiple hubs, each hub might implement a specific class of technologies.

Whereas present-day distributed architectures are stilted due to the need to protect data through the containers that they reside in, the enablement of visibility and control facilitates the caching of electronic content closer to the expected consumer, which optimizes the data path, whereas the control path for key access and for metering is easier to optimize for cloud scale. This provides the underpinning for new architectures that enable higher-scale and greater efficiency, noting that the current corporate and Internet traffic is dominated by video and file sharing.

Figure 1:
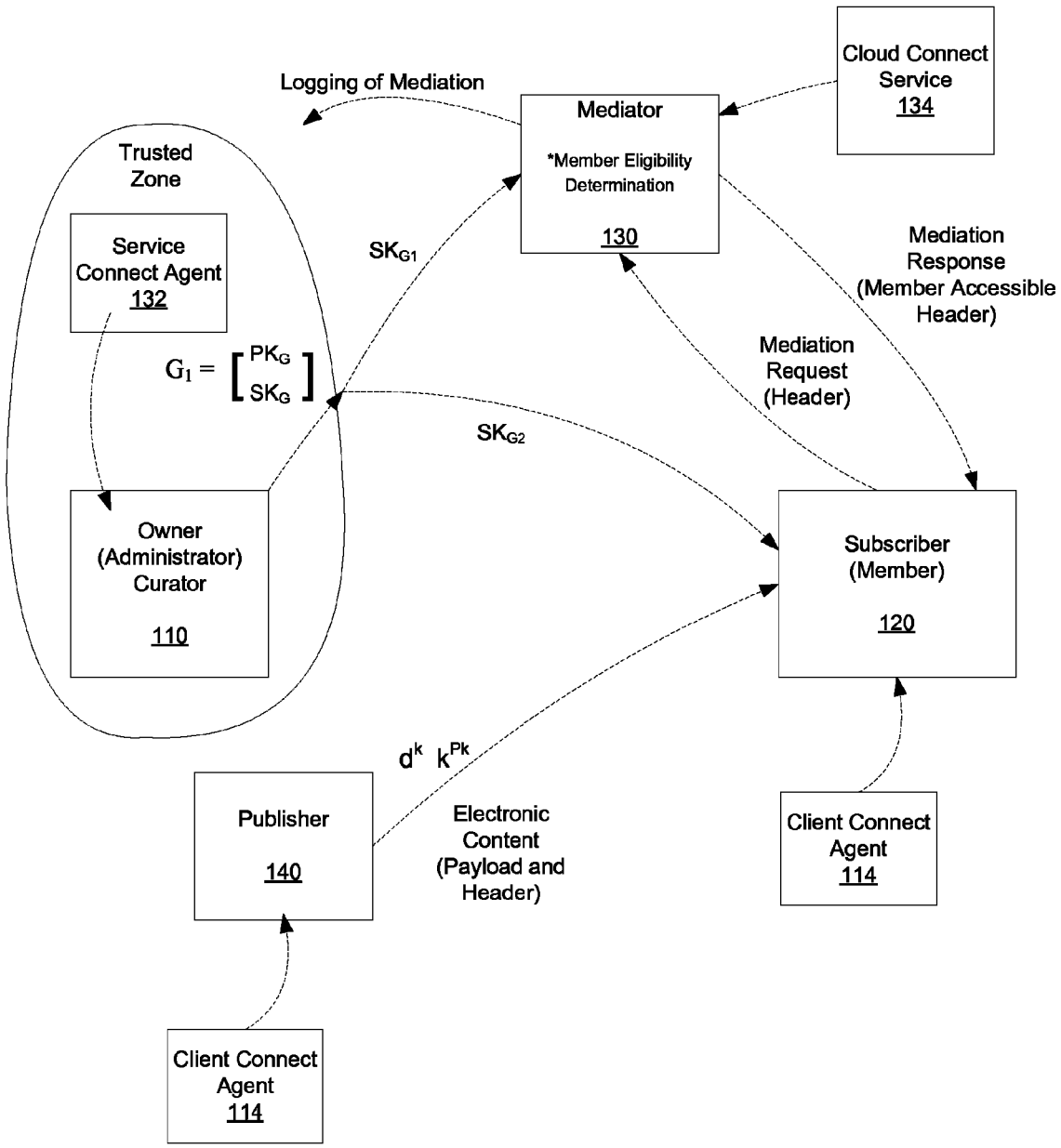
FIG. 1 shows a system that provides for monitoring and control of access to an electronic content, according to an embodiment.

FIG. 1 shows a system that provides for monitoring and control of access to an electronic content, according to an embodiment. As shown, the system includes an owner 110, a member 120, and a mediator 130. An embodiment includes the formation of a group, wherein the group allows for the sharing and collaboration of a document, or more generally, electronic content. The group is formed by the owner 110. For an embodiment, formation of the group includes the owner 110 publishing a group public key $PK_G$, and generating and maintaining a group secret key $SK_G$ as a secret. The owner can store the group secret key $SK_G$, for example, in its own data center.

Further, the member 120 and the mediator 130 each publish their own public keys, and maintain corresponding secret keys as a secret. The member 120 and the mediator 130 can each secure their secret key by protecting the secret key through encryption before storing or transmitting the secret key to a custodian. That key encryption key can be derived from a pass phrase that only the principal (originator of the secret key) knows.

Once the group has been formed, the owner 110 adds members (such as member 120) by generating a first share $SK_{G1}$ from the group secret key $SK_G$ and a public key of a member, and a second share $SK_{G2}$ from the group secret key $SK_G$ and a public key of a mediator. The owner 110 adds the member to the group by obtaining the member's public key from the mediator (or some other public source).

Once the group has been formed and the owner 110 has published the group public key $PK_G$, a publisher 140 can encrypt a document (more generally, electronic content) using the group public key $PK_G$. For an embodiment, the user retrieves the group public key $PK_G$ from a custodian (owner 110), wherein the custodian is operating in the directory role. For an embodiment, the document is encrypted according to a key K, and the key K is encrypted according to the group public key $PK_G$. For an embodiment, the document includes a payload and a header.

The member 120 can obtain the encrypted document in various ways. The publisher 140 may send the encrypted document to the member 120, the member 120 may retrieve the encrypted document, or there may be an intermediary, such as, Drop Box® between the publisher 140 and the member 120.

The member 120 receives the document, but cannot directly decrypt the document because the member 120 does not have access to the group secret key $SK_G$. However, at least some embodiments allow the member 120 to decrypt the document through the aid of the mediator 130. More specifically, for an embodiment, the member 120 request mediation by the mediator 130 by submitting the header of the document to the mediator 130. If the electronic content is small, the header may actually be the payload of the electronic content. More typically, the payload is large, and the header only includes a cryptographic secret that can be used to unlock the payload.

In another embodiment, a user server publishes the actual payload to a location that is resilient against inappropriate access or modification, or because the payload is too voluminous for transmission in the data path, and publishing a capability for gaining access in lieu of the payload, and the member server consequently requiring mediation in order to access that capability for gaining access to the payload.

In certain situations where there is a pre-defined data path, such as document sharing through a solution such as Dropbox®, the encrypted document, and the associated metadata is best packaged as a single unit that travels together. The original document that is encrypted is termed the 'payload', and the header contains the cryptographic material and any associated document classifications and/or access policies.

In other situations where the digital content is too unwieldy to share through a solution such as Dropbox®, either due to the size, or to the streaming nature of access, it may be better to replace the payload with an address. In this situation, the header contains a capability that constitutes both a location that is otherwise difficult to guess, along with the cryptographic material for an authorized party to perform cryptographic operations such as verification and decryption. In this case there might be other benefits, such as tamper prevention, since lack of access to that capability would typically preclude accidental or malicious defacement or deletion, where defacement renders that original content inaccessible.

In other situations the payload itself might be very small, perhaps representing an offer or a bid in a marketplace scenario, or some other secret that needs to be securely stored or shared. In this case it might be optimal to embed this secret directly within the header. After a successful mediation operation, the secret becomes directly accessible to the authorized recipient (such as, member 120) without the subsequent need to unlock any payload.

Once the mediator 130 receives the request for mediation from the member 120, the mediator 130 checks to confirm that the member 120 is eligible for decryption of the document. The eligibility of the member 120 can be determined in one or more ways.

One mechanism for determining member eligibility is for the mediator 130 to maintain a white list, or a black list of eligible members. Typically the owner 110, or the delegate or auditor updates this list. In this case the member 120 is eligible if they are on the white list, or if they are not on the black list, or both.

Another mechanism for determining member eligibility is for the mediator 130 to maintain a matrix of authorization, where one dimension of the matrix is the document classification, while the other dimension is the access requirements. The first might be transferred securely (and privately in some cases) from the publisher 140, to the mediator 130 through the header. The second might specify individuals (through a white or black list), or it might specify specific roles that a requestor needs to be member of, which is sometimes described as RBAC, or Role Based Access Control. The second might also specify a claim that the member 120 needs to provide to prove they have legitimate access to that document. This might be either an ancillary mechanism that is used in addition to group membership usually signs this claim, or it might be in lieu of group membership (where any member with the right claim will have access to that document). Some authority that the Mediator knows of can issue such a claim.

There are other mechanisms for the mediator 130 to determine eligibility of a member 120, which involve integration with existing enterprise and federation infrastructures. For example, in a policy-based network, the mediator 130 may serve as an enforcement point (or Policy Enforcement Point) that needs to check with one or more Policy Decision Points before it executes the mediation.

For an embodiment, the mediator 130 logs the requests by the member, eligibility determinations, and mediator responses. For an embodiment, the logging includes the mediator 130 storing the requests by the member, eligibility determinations, and mediator responses. Each of these can be logged at a server, wherein the server is accessible by the owner and others. For an embodiment, the logging includes the mediator dispatching alerts of the requests by the member, eligibility determinations, and mediator responses to the owner and others.

Due to the trustworthy nature of the hub, it is an enabler of fine-grain lifecycle management of electronic content, perhaps in cases where it might be a business record, and this facilitates the enforcement of retention, disposition, hold, and other events of data that is owned by an individual or organization, but is outside their region of control.

Based on the configuration, the hub may either log access requests (either ones that failed due to lack of eligibility, or both). These logs may be made available to just the parties authorized by the group owner, or their delegate or auditor. In other cases the logs may be delivered in the form of alerts to the group owner, or their delegate or auditor, in cases where there is a need for rapid notification.

If the mediator 130 determines that the member 120 is eligible, the mediator 130 responds to the request for mediation with a member accessible header, wherein the member accessible header includes the header after application of $SK_{G2}$.

Typically the logs and alerts from the hub are integrated with enterprise infrastructure that might range from Syslogd, to specialized monitoring and discovery solutions, or possibly to high-scale log processing systems that might post-process these logs for purposes that might include filtering, classification, pattern or anomaly detection. In many cases, a cloud or similar network can provide an end-to-end service that would significantly reduce any individual or organization's capital and operational expenses.

For an embodiment, the member 120 obtains a secret based on $SK_{G1}$ and the member accessible header. Further, the member 120 decrypts the payload of the electronic content using the secret. Through the controlled document (electronic content) access of the described embodiments, the member 120 is able to decrypt the document only through the participation and control of the mediator, and the owner 110.

As shown, the mediator 130 is at least partially controlled by a cloud connect service (CCS) 134, the member 120 and the publisher 140 are at least partially controlled by a client connect agent (CCA) 114, and the owner 110 is at least partially controlled by a service connect agent (SCA) 132. The owner 110 operates within a trusted zone and the mediator operates within a partially trusted zone.

In some embodiments the CCS 134 centralizes roles that include Directory, Key Store, Mediator, Log Storage and Delivery, and others. In other embodiments a separate party that includes the owner operator or their organization or delegate hosts the Mediator.

It is to be understood that the roles of each of the parties (owner 110, member 120, mediator 130, publisher 140) can be changed, and/or the parties can play multiple roles. That is, for example, the member 120 can additionally play the role of owner. In some embodiments the group owner 110 represents more than one individual, whereby access to the group secret key itself is mediated in a similar operation.

FIG. 1 provides trustworthy workflow between a publisher 140 and a member 120 of a group formed by an owner 110. For an embodiment, the owner 110 includes a custodian. For an embodiment, the mediator 130 includes a curator. Each of the owner 110, the member 120, the mediator 130 and the publisher 140 include servers, wherein each server includes at least one or more processors and memory.

Figure 2:
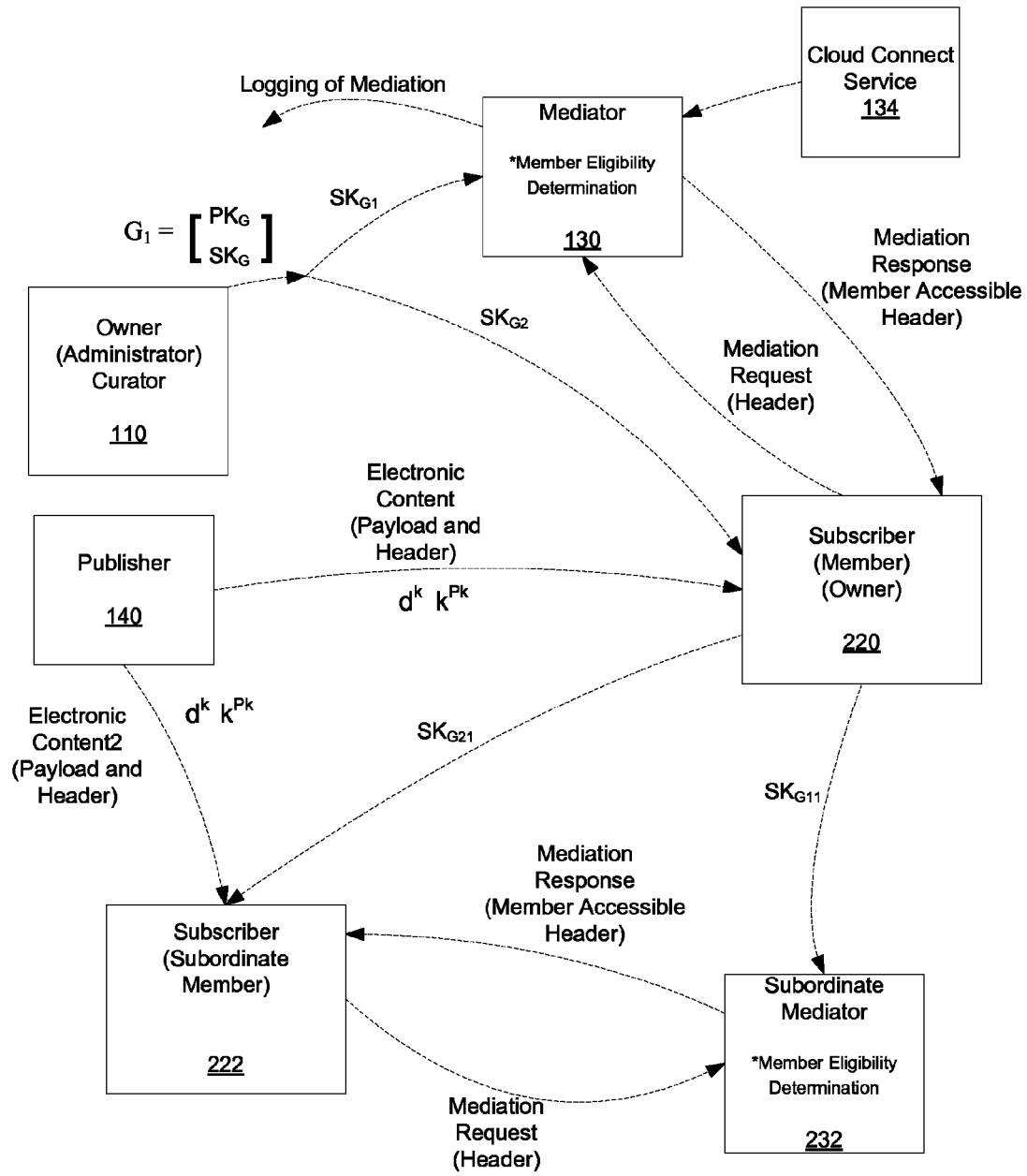
FIG. 2 shows another system that provides for monitoring and control of access to an electronic content, according to an embodiment.

FIG. 2 shows another system that provides for monitoring and control of access to an electronic content, according to an embodiment. FIG. 2 shows that for an embodiment, the member 220 can also play the role of an owner, and create a subordinate group that includes a subordinate member 222. As previously described, each of the parties of the system can be multiple roles.

Similar to the group formation previously described, the owner 220 (also playing the role of member as previously described) publishes a group public key $PK_{G2}$, and generating and maintaining a group secret key $SK_{G2}$ as a secret. The owner can store the group secret key $SK_{G2}$, for example, in its own data center.

The subordinate member 222 and a subordinate mediator 232 each publish their own public keys, and maintain corresponding secret keys as a secret. The subordinate member 222 and the subordinate mediator 232 can each secure their secret key by protecting the secret key through encryption before storing or transmitting the secret key to a custodian. That key encryption key can be derived from a pass phrase that only the principal (originator of the secret key) knows.

Once the group has been formed, the owner 220 adds members (such as sub-ordinate member 222) by generating a first share $SK_{G21}$ from the group secret key $SK_{G2}$ and a public key of the sub-ordinate member 222, and a second share $SK_{G2}$ from the group secret key $SK_{G2}$ and a public key of a sub-ordinate mediator 232. The owner 220 adds the sub-ordinate member to the group by obtaining the sub-ordinate member's public from the sub-ordinate mediator 232 (or some other public source).

Once the group has been formed and the owner 220 has published the group public key $PK_{G21}$, the publisher 140 (note that this can be an entirely different publisher than previously described) can encrypt a document (more generally, electronic content) using the group public key $PK_{G21}$. For an embodiment, the sub-ordinate user 222 retrieves the group public key $PK_{G2}$ from the owner 220, wherein the owner 220 is operating in the directory role. For an embodiment, the document is encrypted according to a key K, and the key K is encrypted according to the group public key $P_{KG21}$. For an embodiment, the document includes a payload and a header.

The subordinate member 222 can obtain the encrypted document in various ways. The publisher 140 may send the encrypted document to the subordinate member 222, the subordinate member 222 may retrieve the encrypted document, or there may be an intermediary, such as, drop box between the publisher 140 and the subordinate member 222.

The subordinate sub-ordinate member 222 receives the document, but cannot directly decrypt the document because the sub-ordinate member 222 does not have access to the group secret key $SK_{G21}$. However, at least some embodiments allow the sub-ordinate member 222 to decrypt the document through the aid of the sub-ordinate mediator 232. More specifically, for an embodiment, the sub-ordinate member 222 request mediation by the sub-ordinate mediator 232 by submitting the header of the document to the sub-ordinate mediator 232. If the electronic content is small, the header may actually be the payload of the electronic content. More typically, the payload is large, and the header only includes a cryptographic secret that can be used to unlock the payload.

Once the sub-ordinate mediator 232 receives the request for mediation from the sub-ordinate member 222, the sub-ordinate mediator 232 checks to confirm that the sub-ordinate member 222 is eligible for decryption of the document. The eligibility of the sub-ordinate member 222 can be determined in one more ways.

For an embodiment, the sub-ordinate mediator 232 logs the requests by the member, eligibility determinations, and mediator responses. For an embodiment, the logging includes the sub-ordinate mediator 232 storing the requests by the member, eligibility determinations, and mediator responses. Each of these can be logged at a server, wherein the server is accessible by the owner and others. For an embodiment, the logging includes the mediator dispatching alerts of the requests by the member, eligibility determinations, and mediator responses to the owner and others.

If the sub-ordinate mediator 232 determines that the sub-ordinate member 222 is eligible, the sub-ordinate mediator 232 responds to the request for mediation with a member accessible header, wherein the member accessible header includes the header after application of $SK_{G21}$.

For an embodiment, the sub-ordinate member 222 obtains a secret based on $SK_{G11}$ and the member accessible header. Further, the sub-ordinate member 222 decrypts the payload of the electronic content using the secret. Through the controlled document (electronic content) access of the described embodiments, the sub-ordinate member 222 is able to decrypt the document only through the participation and control of the mediator, and the owner 220.

Figure 3:
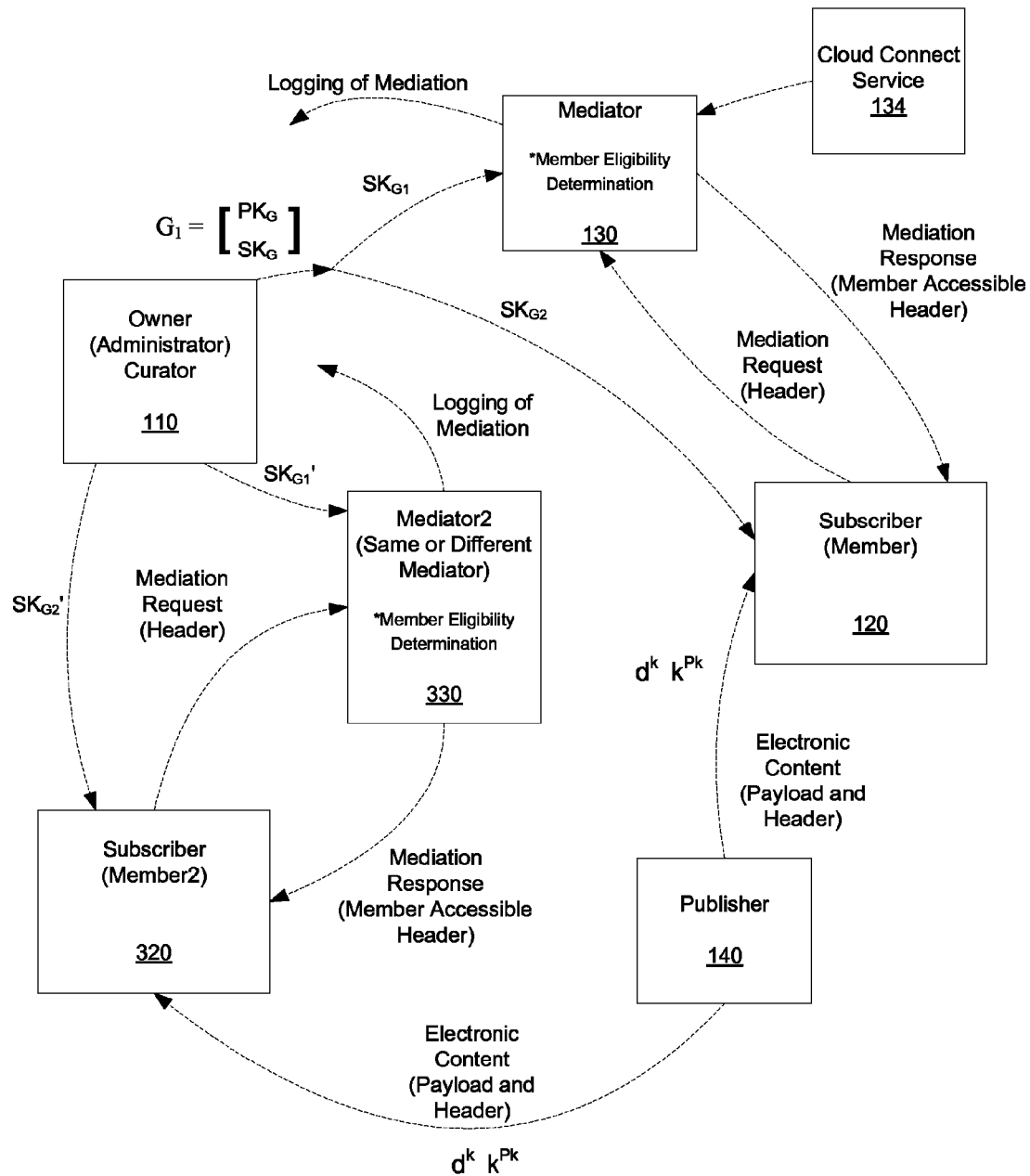
FIG. 3 shows another system that provides for monitoring and control of access to an electronic content, according to an embodiment.

FIG. 3 shows another system that provides for monitoring and control of access to an electronic content, according to an embodiment. This embodiment includes the addition of a second member 320. Similar to the embodiments previously described, the owner 110 can add the second member 320 by generating a first share $SK_{G1}'$ from the group secret key $SK_G$ and a public key of the second member, and a second share $SK_{G2}'$ from the group secret key $SK_G$ and the public key of the mediator (here, a second mediator 330 is shown, but the mediator can alternatively be the prior mediator 130). Further, the owner 110 provides the first share $SK_{G1}'$ to the second member 320 and the second share $SK_{G2}'$ to the mediator 330, wherein the second share $SK_{G2}$ is different than the second share $SK_{G2}'$.

For at least some embodiments, there are multiple mediators for either business reasons, such as separation of responsibilities, or for compliance reasons where certain categories of mediation are performed by a compliant entity, or for federal or government reasons where some of the mediation is deemed to be more sensitive. In addition to partitioning of mediators in this manner, it might be desired to have a level of redundancy and scale by duplicating the functionality of a mediator across multiple instances.

Figure 4:
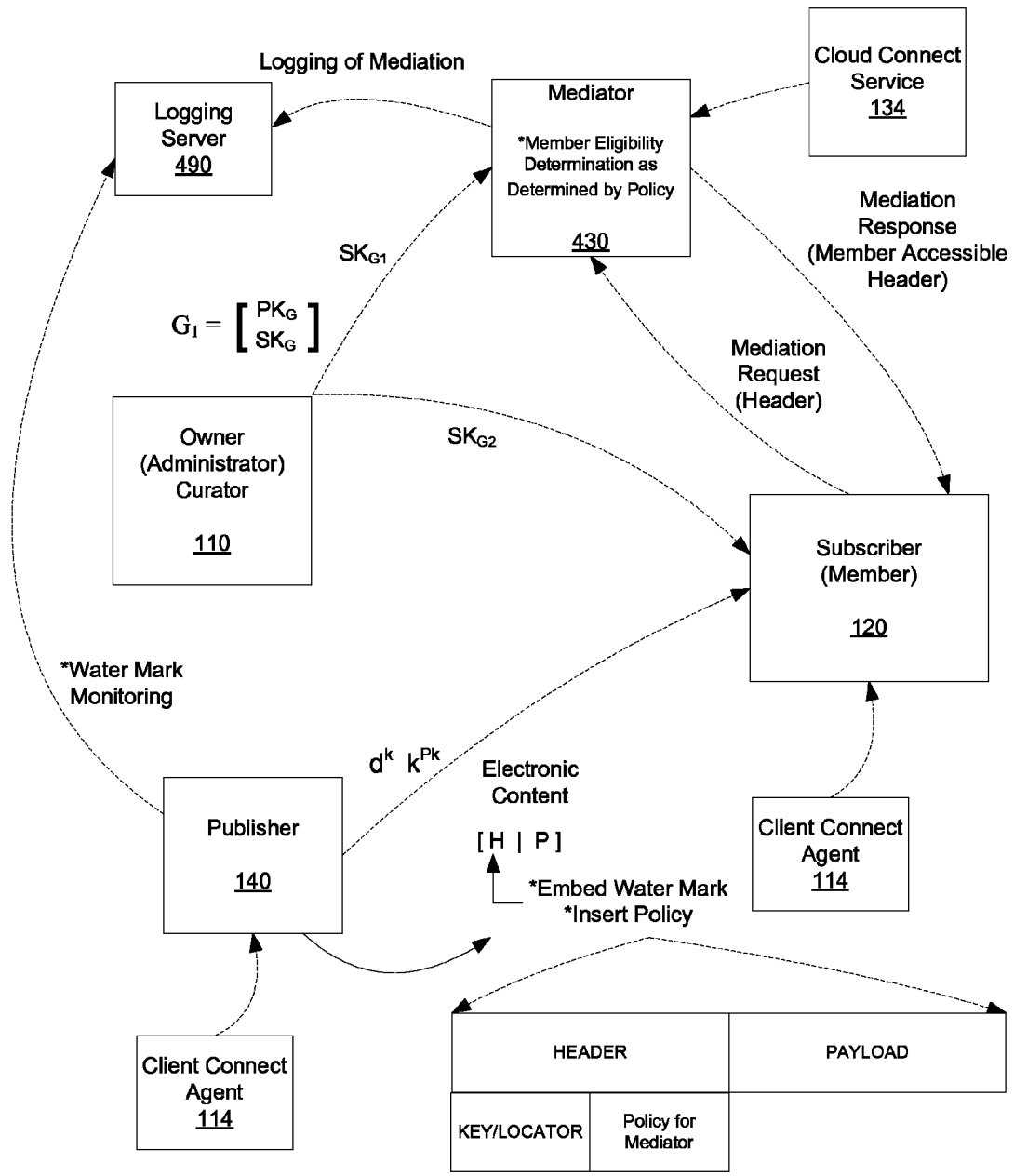
FIG. 4 shows another system that provides for monitoring and control of access to an electronic content, according to an embodiment.

FIG. 4 shows another system that provides for monitoring and control of access to an electronic content, according to an embodiment. This embodiment includes water mark and policy controls of the publisher. As previously described, the publisher 140 provides a document (more generally, electronic content) to the member 120 that includes a header a payload. As previously described, for an embodiment, if the electronic content is small, the header may actually be the payload of the electronic content. For another embodiment, the payload is large, and the header only includes a cryptographic secret that can be used to unlock the payload. For an embodiment, the payload includes a pointer to where the electronic content is located (stored). Again, the header may include a cryptographic secret that can be used to unlock the payload (pointer).

The publish 140 can maintain some control by embedding, for example, an opaque watermark in the header, and logging (at, for example, a logging server 490), by a mediator 430, the header when received by the mediator 430 from the member, 120 thereby allowing the publisher 140 to track the electronic content. For at least some embodiments, the watermark is selectively translucent to other parties, perhaps log processing services, that might be able to detect patterns and anomalies, but in a manner that minimizes compromise of sensitive content. As shown in FIG. 4, the header may include a key/locator that is necessary for the intended recipient to obtain access to the sensitive payload. For at least some embodiments, the received document is a composite of a header and a payload, and the secret is the decryption key that is made available subsequent to mediation. In addition, for at least some embodiments, the secret might is augmented with a verification key for ensuring that the payload has not been tampered with in transit or storage. In cases where this payload is absent, perhaps for reasons of efficiency or enhanced security, the secret might also consist of a locator, such as a Uniform Resource Identifier, along with a decryption key. The intended recipient only knows of the real location of the payload that is a candidate for decryption after a successful mediation.

Another embodiment includes the publisher 140 inserting, an electronic content specific policy in the header (as shown in FIG. 4 as a policy for mediator 430), wherein only the mediator 430 can decrypt the policy, and wherein the electronic content specific policy provides additional instructions regarding eligibility of the member. For an embodiment, the policy directs the mediator to request mediation from a higher mediator authority. In at least some embodiments, the policy is not visible to the members, but is made available to the mediator 430. In other embodiments, the policy that is visible to the mediator 430 consists of subsequent instructions, such as the need to consult with a policy decision point, where those instructions to that policy decision point may not necessarily be visible to the mediator 430.

For an embodiment, the header optionally contains visible information for intermediaries to perform cryptographic operations that might include checking for integrity of the encrypted payload, or establishing non-repudiation or data provenance. For an embodiment, the member accessible header optionally contains information for performing cryptographic operations that might include checking for integrity of the encrypted or decrypted payload, or establishing non-repudiation or data provenance.

Figure 5:
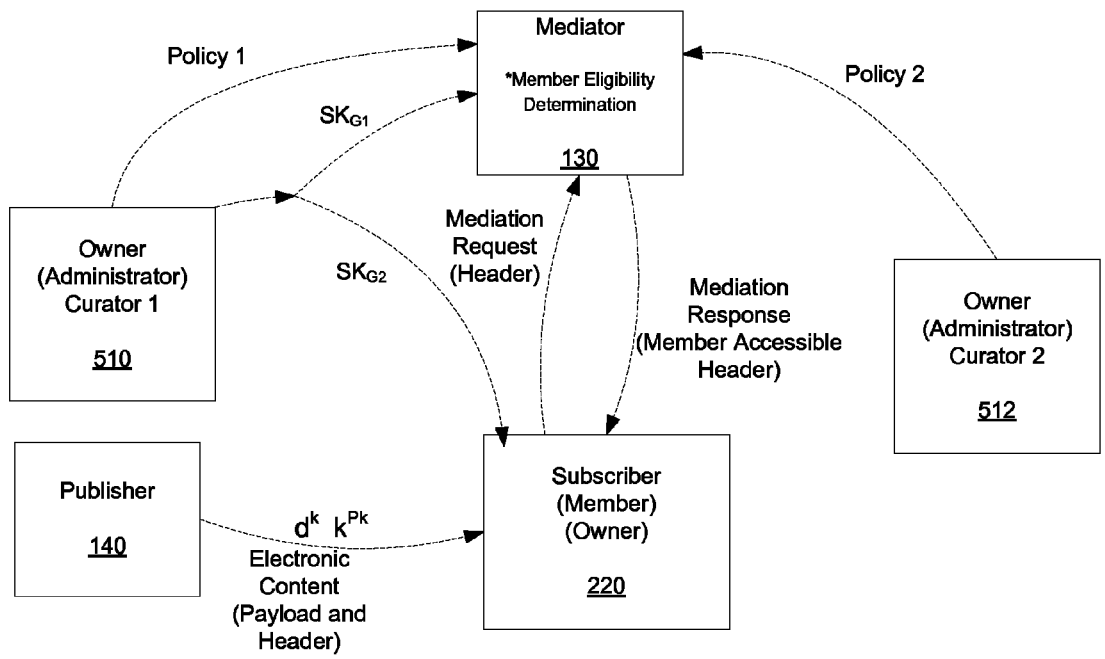
FIG. 5 shows another system that provides for monitoring and control of access to an electronic content, according to an embodiment.

FIG. 5 shows another system that provides for monitoring and control of access to an electronic content, according to an embodiment. This embodiment includes a first owner 510 and a second owner 512. As shown, the first owner 510 provides a first policy and the second owner 512 provides a second policy. This embodiment provides for extension to multiple owners (curators) and provides federation of the curators, wherein each owner (curator) is responsible for their own sets of content. While two owners are shown, the described embodiments are not limited to two owners.

Typically in a scenario that involves collaboration or commerce, there are diverse, perhaps mutually distrustful participants that need to manage their own access policies that might include management of white or black lists, and perhaps ratings of buyers, sellers or other participants. These scenarios are "federated" and can consist of more than one owners might either have exclusive control over their respective sets of documents that they are the resource providers of, or it may be the case that they may have to co-operate through some policy to be able to update or modify the mediation policy.

Figure 6:
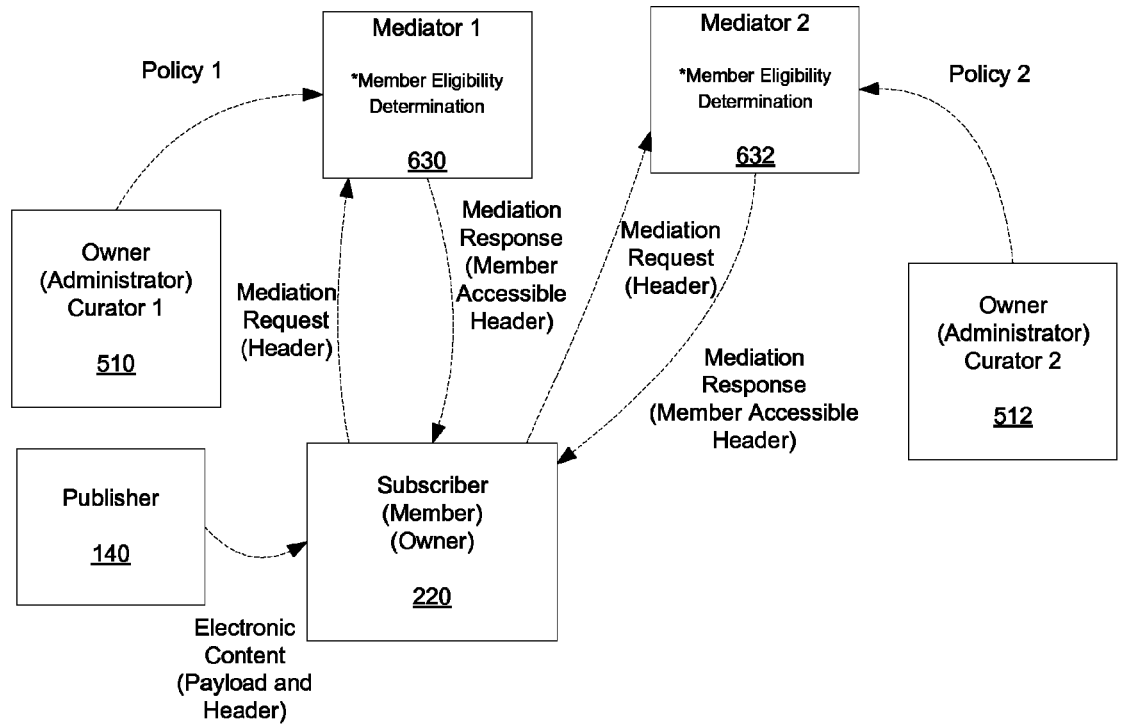
FIG. 6 shows another system that provides for monitoring and control of access to an electronic content, according to an embodiment.

FIG. 6 shows another system that provides for monitoring and control of access to an electronic content, according to an embodiment. This embodiment includes a first mediator 630 and a second mediator 632. For mediation, each of the mediators 630, 632 weigh in. While two mediators are shown, the described embodiments are not limited to two mediators.

The described embodiments enable the high-scale enablement of existing networks such as International Trade, where multiple mediators, as described below, might represent the banks that represent buyers and sellers, and the eligibility for access to electronic goods, or to the payment, is gated by the need for a successful mediation by the appropriate mediator, which is likely to have up-to-date information about the transaction in question.

There are other federation scenarios where the participants may not be willing or able to agree upon a single mediator. This might be for global commerce, where the physical location of a mediator might make it subject to disruption or coercion by local powers. In such a situation, at least some embodiment include more than one mediator that is isolated within distinct physical or electronic boundaries that limits physical or electronic access, and the successful mediation requires all mediators to execute a mediation operation. It is possible to have more expressive circuits, such as thresholds, where perhaps a specified majority of mediators needs to execute their part in the mediation, before the intended recipient gets access to the payload.

Figure 7:
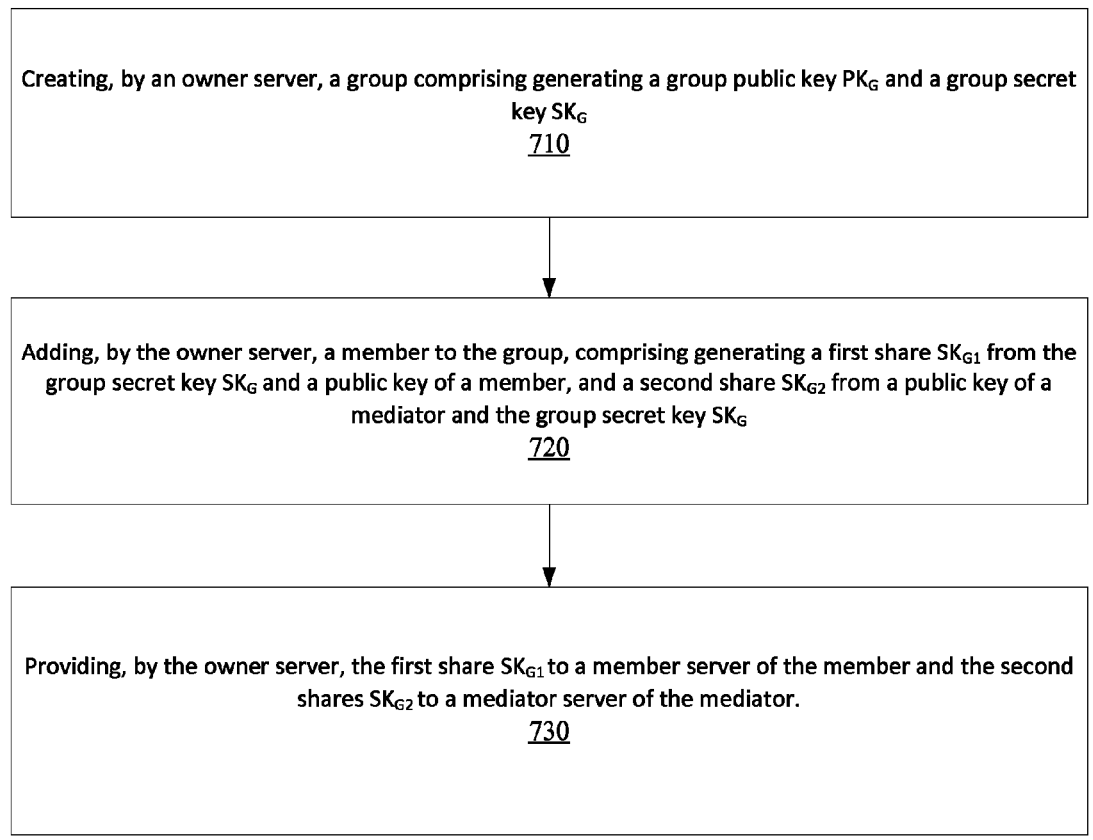
FIG. 7 is a flow chart that includes steps of a method for monitoring and control of access to an electronic content, according to an embodiment.

FIG. 7 is a flow chart that includes steps of a method for monitoring and control of access to an electronic content, according to an embodiment. A first step 710 includes creating, by an owner server, a group comprising generating a group public key $PK_G$ and a group secret key $SK_G$. A second step 720 includes adding, by the owner server, a member to the group, comprising generating a first share $SK_{G1}$ from the group secret key $SK_G$ and a public key of a member, and a second share $SK_{G2}$ from the group secret key $SK_G$ and a public key of a mediator. A third step 730 includes providing, by the owner server, the first share $SK_{G1}$ to a member server of the member and the second shares $SK_{G2}$ to a mediator server of the mediator.

Figure 8:
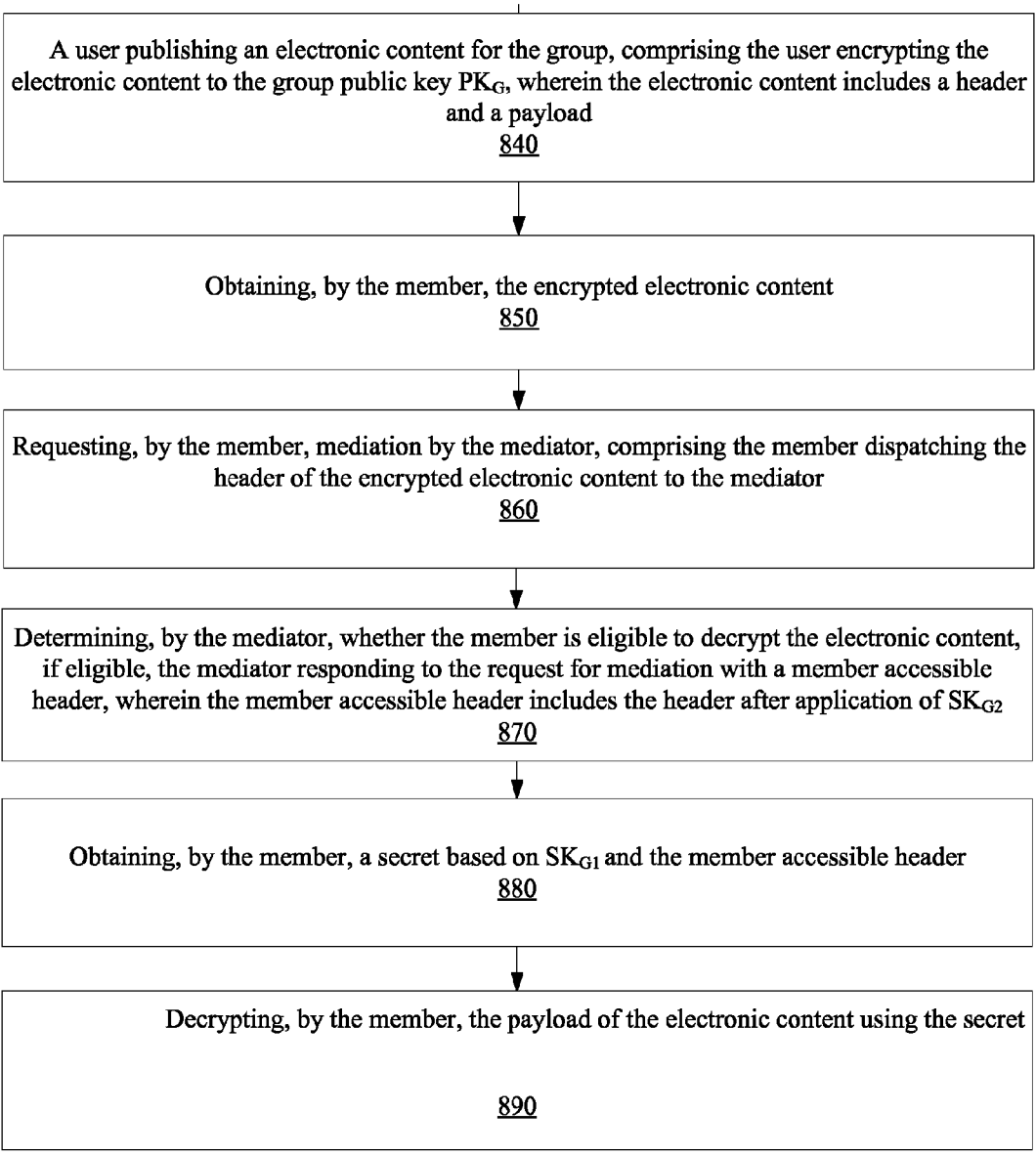
FIG. 8 is a flow chart that includes additional steps of a method for monitoring and control of access to an electronic content, according to an embodiment.

FIG. 8 is a flow chart that includes additional steps of a method for monitoring and control of access to an electronic content, according to an embodiment. A first step 840 includes a user publishing an electronic content for the group, comprising the user encrypting the electronic content to the group public key $PK_G$, wherein the electronic content includes a header and a payload. A second step 850 includes obtaining, by the member, the encrypted electronic content. A third step 860 includes requesting, by the member, mediation by the mediator, comprising the member dispatching the header of the encrypted electronic content to the mediator. A fourth step 870 includes determining, by the mediator, whether the member is eligible to decrypt the electronic content, if eligible, the mediator responding to the request for mediation with a member accessible header, wherein the member accessible header includes the header after application of $SK_{G2}$. A fifth step 880 includes obtaining, by the member, a secret based on $SK_{G1}$ and the member accessible header. A sixth step 890 includes decrypting, by the member, the payload of the electronic content using the secret.

As previously described, an embodiment includes the mediator logging requests by the member, eligibility determinations, and mediator responses. Specifically, for an embodiment, the logging includes the mediator storing the requests by the member, eligibility determinations, and mediator responses at a server, wherein the server is accessible by the owner and others. For another embodiment, the logging includes the mediator dispatching alerts of the requests by the member, eligibility determinations, and mediator responses to the owner and others.

As previously described, for an embodiment determining whether the member is eligible includes the mediator being notified by the owner prior to the mediation request. For another embodiment determining whether the member is eligible comprises the mediator being notified by the owner or another authority prior to the mediation request that the member's public key in invalid.

As previously described, for an embodiment, if the payload is greater than a threshold in size, the header includes a secret needed to decrypt the payload. If the payload is less than the threshold in size, the header is the payload.

As previously described, an embodiment further includes the member acting in an owner capacity, and creating a subordinate group. For an embodiment, this includes creating, by the member, a subordinate group comprising generating a subordinate group public key $PK_G$ and a subordinate group secret key $SK_G$, adding, by the member, a subordinate member to the subordinate group, including generating a first share $SK_{G11}$ from the subordinate group secret key $SK_G$ and a public key of a subordinate member, and a second share $SK_{G21}$ from the subordinate group secret key $SK_G$ and a public key of a subordinate mediator, and providing the member the first share $SK_{G11}$ to a subordinate member server of the subordinate member and the second shares $SK_{G21}$ to a subordinate mediator server of the subordinate mediator.

As previously described, an embodiment includes adding, by the owner server, a second member to the group, comprising generating a first share $SK2_{G1}$ from the group secret key $SK_G$ and a public key of the second member, and a second share $SK_{G2}'$ from the group secret key $SK_G$ and the public key of the mediator, and providing, by the owner server, the first share $SK_{G1}'$ to a second member server of the second member and the second share $SK_{G2}'$ to the mediator server of the mediator, wherein the second share $SK_{G2}$ is different than the second share $SK_{G2}'$.

As previously described, an embodiment further includes embedding, by the publisher, an opaque watermark in the header, and logging, by the mediator, the header when received by the mediator from the member, thereby allowing the publisher to track the electronic content.

As previously described, an embodiment further includes inserting, by the publisher, an electronic content specific policy in the header, wherein only the mediator can decrypt the policy, and wherein the electronic content specific policy provides additional instructions regarding eligibility of the member. For an embodiment, the policy directs the mediator to request mediation from a higher mediator authority.

Figure 9:
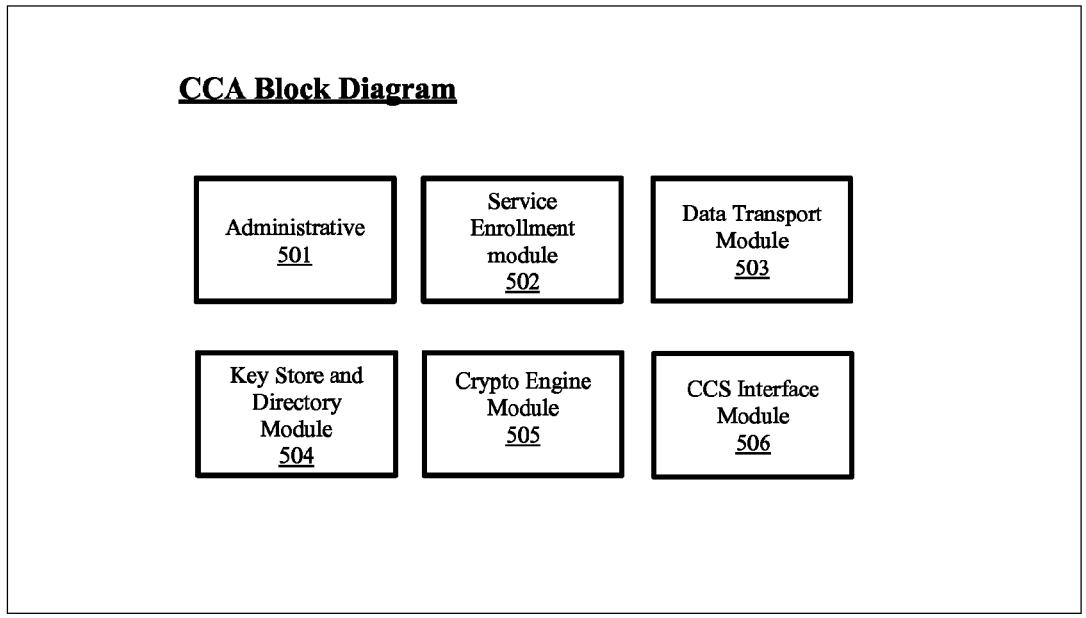
FIG. 9 shows a client connect agent according to an embodiment.

FIG. 9 shows an embodiment of the client connect agent (CCA) according to an embodiment. As previously described and shown in FIGS. 1, 2, 3 and 4, the member 120 and the publisher 140 have access to the client connect agent (CCA) 114. As described, an embodiment of CCA can be an independent software application program running in the member 120 or the publisher's 140 computing device, such as desktop, laptop, mobile device, etc. Another embodiment of CCA is operable to run within a web browser.

As shown, this embodiment includes at least the following modules an Administrative Module 501, a Service Enrollment Module 502, a Data Transport Module 503, a Key Store and Directory Module 504, a Crypto Engine Module 505, and a CCS Interface Module 506.

For an embodiment, the Administrative Module 501 performs various configuration and administrative tasks to configure the local CCA, to manage users and groups within the CCA control, to interface with human users through a command line interface (CLI) or a UI interface (UI), to interface with other programs through an application programming interface (API), to update CCA software from the connected CCS, and to send event logs to CCS via CCS Interface Module 506.

For an embodiment, the Service Enrollment Module 502 performs enrollment tasks with a realm that is represented by one or more curators. The Service Enrollment Module 502 also manages the password and the login process with the connected CCS, among others.

For an embodiment, the Data Transport Module 503 is responsible for data upload and download. The data can be uploaded from the compute device where the CCA operates and to any data repository in the cloud through any data transfer protocol such as email, HTTP, FTP, etc. or physical data storage media such as floppy disc, CD ROM, DVD ROM, USB Drive, etc., and vice versa.

For an embodiment, the Key Store and Directory Module 504 stores local user's secrets (such as the private/secret keys) that are encrypted and copies of various certificates that can be used for local CCA cache access and offline operations.

For an embodiment, the Crypto Engine Module 505 performs various encryption/decryption, signing, and key generation functions.

For an embodiment, the CCS Interface Module 506 performs secure communications with CCS. For at least some embodiments, the CCS Interface Module 506 includes a RESTful interface Adapter—CRUD calls for data and control communications between SCA and CCS, a WebSockets—Receive Callbacks from CCS, and a DNS Resolver—fast path for querying the CCS for directory (certificates) lookup and requesting for Mediation operations.

Figure 10:
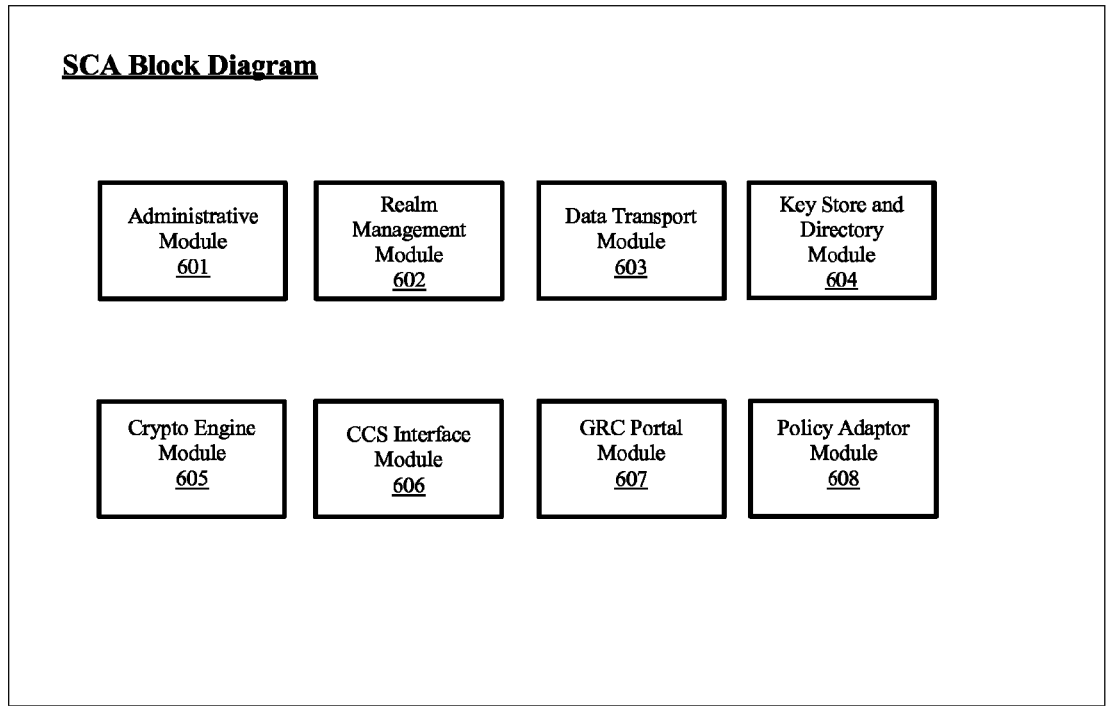
FIG. 10 shows a service connect agent according to an embodiment.

As shown, the owner 110 as shown in FIGS. 1, 2, 3 and 4 is at least partially controlled by a server connect agent (SCA) 142. For an embodiment, the SCA 142 includes a software appliance that can be packaged as, but not limited by, a piece of executable program in a binary form, a virtual machine, or a dedicated server. For at least some embodiments, the software appliance runs within a curator's firewall. Depicted in FIG. 10, the embodiments of the SCA 142 includes an Administrative Module 601, a Realm Management Module 602, a Data Transport Module 603, a Key Store and Directory Module 604, a Crypto Engine Module 605, a CCS Interface Module 606, a GRC Portal Module 607, an a Policy Adaptor Module 608.

For at least some embodiments, the Administrative Module 601 performs various configuration and administrative tasks to configure the local SCA, to manage users and groups within the SCA control, to interface with human users through a command line interface (CLI) or a UI interface (UI), to interface with other programs through an application programming interface (API), to update SCA software from the connected CCS, and to send event logs to CCS via CCS Interface Module 506.

For at least some embodiments, the Realm Management Module 602 is responsible for creating and managing a realm. the Realm Management Module 602 performs tasks to invite or permit parties that are partially controlled by CCAs to join the realm. It is also capable of revoking a realm membership. For an embodiment, a realm is one or more curators that are controlled by one SCA. Parties participating in the trustworthy workflow must be enrolled in at least one realm.

For at least some embodiments, the Data Transport Module 603 is responsible for data upload and download. The data can be uploaded from any data source within the one or more curators controlled by the SCA and to any data repository in the cloud through any data transfer protocol such as email, HTTP, FTP, etc. or physical data storage media such as floppy disc, CD ROM, DVD ROM, USB Drive, etc., and vice versa. One source of data can be content containers controlled by Microsoft© SharePoint software.

For at least some embodiments, the Key Store and Directory Module 604 stores the realm user's secrets (such as their private/secret keys) that are encrypted and copies of various certificates that can be used for the SCA cache access and offline operations.

For at least some embodiments, the Crypto Engine Module 605 performs various encryption/decryption, signing, and key generation functions.

For at least some embodiments, the CCS Interface Module 606 performs secure communications with CCS. At least some embodiments of the CCS Interface Module 606 include a RESTful interface Adapter—CRUD calls for data and control communications between the SCA and CCS, a WebSockets—Receive Callbacks from CCS, and a DNS Resolver—fast path for querying the CCS for directory (certificates) lookup and requesting for Mediation operations.

For at least some embodiments, the GRC Portal Module 607 is responsible for configuring logs, alerts and reports for the realm, querying, and receiving from, CCS for logs, alerts and reports, searching and indexing logs, and caching logs locally, and presenting the log information.

For at least some embodiments, the Policy Adaptor Module 608 provides integration interfaces with the existing data and identity management infrastructures in the one or more curators controlled by the SCA. For at least some embodiments, the interfaces include support for protocols and services such as, an Active Directory (AD), an Active Directory Federation Services (ADFS), a Certificate Authority (CA), a Security Assertion Markup Language (SAML), an Online Certificate Status Protocol (OCSP), and/or Proxy Services.

As shown in FIGS. 1, 2, 3 and 4, the mediator 130 at least partially controlled by a cloud connect service (CCS) 134. For at least some embodiments, the CCS 134 is a collection of software running as Software as a Service (SaaS) in the cloud, hosted by one or multiple Infrastructure as a Service (IaaS) providers. It is a high-scale, always-on, possibly geo-distributed policy enforcement point, which can facilitate complex, possibly cross-continental collaboration and commerce. The CCS 134 is termed "Trustworthy", meaning that it cannot access any data or policy in the clear or cheat because it is prevented from doing so by cryptography based technologies. Without such a capability it would be technologically complex to monitor and enforce CCS 134 behavior, if at all that were to be possible.

Figure 11:
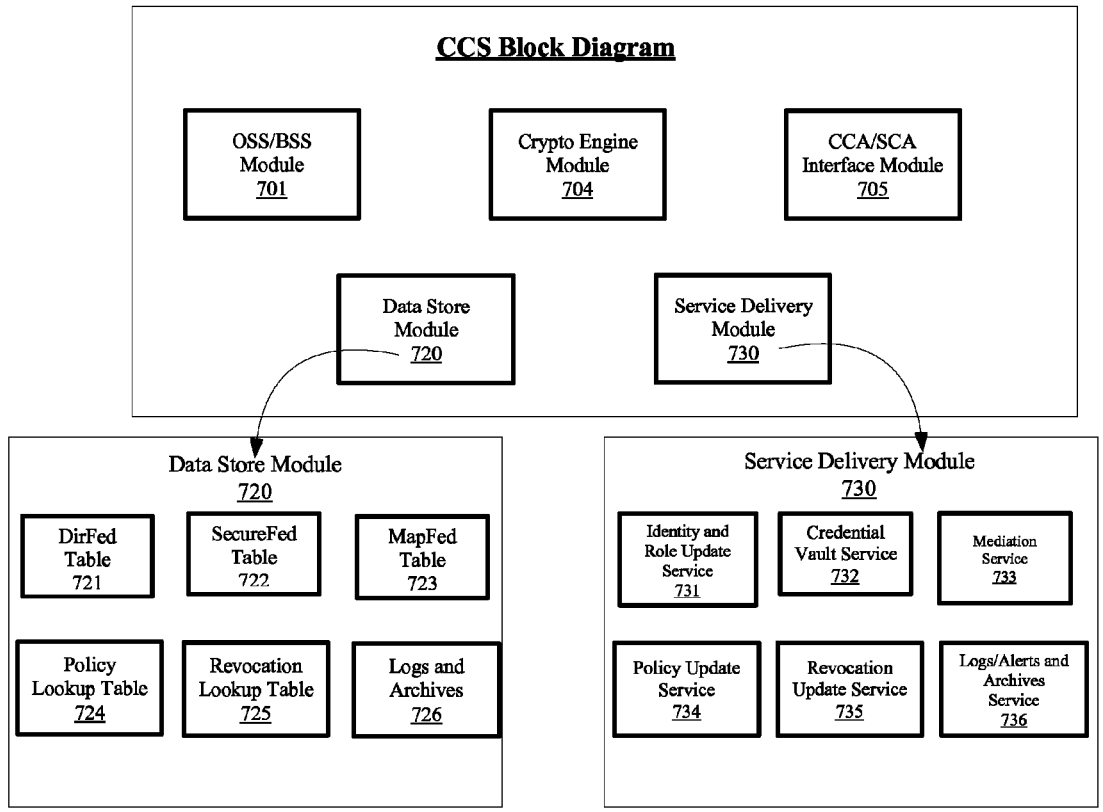
FIG. 11 shows a cloud connect service according to an embodiment.

As illustrated in FIG. 11, at least some embodiments of the CCS 134 include an OSS/BSS Module 701, a Data Store Module 720, a Service Delivery Module 730, a Crypto Engine Module 704, and a CCS/SCA Interface Module 705.

For at least some embodiments, the OSS/BSS Module 701 performs operations including provisioning, metering, billing, syndication, federations, and other external service interfaces. An embodiment of the OSS/BSS Module 701 provides customer support and trouble shooting.

For at least some embodiments, the Data Store Module 720 at least partially includes one or more of a DirFed Table 721, SecureFed Table 722, a MapFed Table 723, a Policy Lookup Table 724, a Revocation Lookup Table 725, and a Logs and Archives 726. For an embodiment, the DirFed Table 721 is a directory for user and group identities, certificates, policies and other artifacts, which are typically represented by the corresponding entity's public keys. For at least some embodiments, the SecureFed Table 722 stores encrypted secrets. For an embodiment, the CCS, nor any custodian, is able to decrypt any entry in this table. For at least some embodiments, the MapFed Table 723 stores, among others, Group membership records, represented, at least partially, through signed Mediation Keys, and Realm roles including attestations and signatures from the realm SCAs. For an embodiment, the Policy Lookup Table 724 provides rapid lookup for multi-hop re-encryption key chains. For an embodiment, the Revocation Lookup Table 725 provides rapid lookup for revocation lists. For an embodiment, the Logs and Archives 726 keeps activities logs and events. It also archives for policies and activities, as well as data.

For at least some embodiments, for each sub-module 721-726, the Service Delivery Module 730 includes at least a corresponding services delivered to CCAs and SCAs. For an embodiment, services 731-736 of the Service Delivery Module 730 may interact with multiple sub modules 721-726. For an embodiment, an Identity and Role Update Service 731 receives identity and role update requests from SCAs and CCAs and updates the corresponding DirFed 721 entries. For an embodiment, a Credential Vault Service 732 uploads and downloads the encrypted data, encrypted keys and encrypted policies upon requests from CCAs and SCAs, and updates entries in SecureFed 722 and Logs and Archives 726. For an embodiment, a Mediation Service 733 receives Mediation Keys and Mediation operation requests from SCAs and CCAs, and performs the requested operations. It updates and reads entries in MapFed 723. It may also interact with Policy Lookup Table 724 and Revocation Lookup Table 725 to validate identities and authorizations. For an embodiment, a Policy Update Service 734 updates groups and group memberships in DirFed 721, upon requests from SCAs, among other tasks. For an embodiment, a Revocation Update Service 735 receives identity and role revocation requests from, primarily, SCAs and updates entries in MapFed 723 and Revocation Lookup Table 725. Among other sources, such requests may originate from the CA and OCSP interfaces in Policy Adaptor Module 608. For an embodiment, a Logs/Alerts and Archives Service 736 receives event logs from SCAs and CCAs and responds to SCAs (GRC Portal Module 607) requests The interaction methods between CCSs, SCAs and CCAs through above described modules and the combined system effects towards providing the trustworthy workflow across trust boundaries will become more apparent from the Operative Steps description as follows.

Although specific embodiments have been described and illustrated, the embodiments are not to be limited to the specific forms or arrangements of parts so described and illustrated.

What is claimed:

1. A method of a mediator monitoring and controlling access to an electronic content, comprising:
   receiving, by a mediator device of a mediator, a second share $SK_{G2}$ from an owner device, wherein a first share $SK_{G1}$ is provided to a member device of a member of a group by the owner device;
   wherein the group is created by the owner device generating a group public key $PK_G$ and a group secret key $SK_G$;
   wherein the member is added by the owner device to the group by generating the first share $SK_{G1}$ from the group secret key $SK_G$ and a public key of the member, and the second share $SK_{G2}$ from the group secret key $SK_G$ and a public key of the mediator;
   wherein a user publishes an electronic content for the group, comprising the user encrypting the electronic content to the group public key $PK_G$, wherein the electronic content includes a header and a payload; and
   wherein the member obtains the encrypted electronic content;
   further comprising;
   the mediator receiving a request, by the member, for mediation, comprising the mediator receiving a dispatch of the header of the encrypted electronic content from the member.

2. The method of claim 1, further comprising
determining, by the mediator, whether the member is eligible to decrypt the electronic content, if eligible, the mediator responding to the request for mediation with a member accessible header, wherein the member accessible header includes the header after application of $SK_{G2}$;
   wherein the member obtains a secret based on $SK_{G1}$ and the member accessible header; and
   wherein the member decrypts the payload of the electronic content using the secret.

3. The method of claim 2, further comprising the mediator logging requests by the member, eligibility determinations, and mediator responses.

4. The method of claim 3, wherein logging comprises the mediator storing the requests by the member, eligibility determinations, and mediator responses at a device, wherein the device is accessible by the owner and others.

5. The method of claim 3, wherein logging comprises the mediator dispatching alerts of the requests by the member, eligibility determinations, and mediator responses to the owner and others.

6. The method of claim 2, wherein determining whether the member is eligible comprises the mediator being notified by the owner prior to the mediation request.

7. The method of claim 2, wherein determining whether the member is eligible comprises the mediator being notified by the owner or another authority prior to the mediation request that the member's public key in invalid.

8. The method of claim 2, wherein if the payload is greater than a threshold in size, the header includes a secret needed to decrypt the payload.

9. The method of claim 1, wherein if the payload is less than a threshold in size, the header is the payload.

10. The method of claim 1, wherein the mediator, the publisher and the member publish public keys and secure corresponding secret keys.

11. The method of claim 1, wherein an opaque watermark in the header is embedded by the publisher, and further comprising:
   logging, by the mediator, the header when received by the mediator from the member, thereby allowing the publisher to track the electronic content.

12. The method of claim 1, wherein the publisher inserts an electronic content specific policy in the header, wherein only the mediator can decrypt the policy, and wherein the electronic content specific policy provides additional instructions regarding eligibility of the member.

13. A mediator device operative to monitor and control access to an electronic content, comprising a mediator of the mediator device operative to:
   receive a second shares $SK_{G2}$ from an owner device, wherein a first share $SK_{G1}$ is provided to a member device of a member by the owner device;
   wherein a group is created by the owner device comprising generating a group public key $PK_G$ and a group secret key $SK_G$;
   wherein the member is added by the owner device to the group by generating the first share $SK_{G1}$ from the group secret key $SK_G$ and a public key of the member, and the second share $SK_{G2}$ from the group secret key $SK_G$ and a public key of the mediator;
   wherein a user publishes an electronic content for the group, comprising the user encrypting the electronic content to the group public key $PK_G$, wherein the electronic content includes a header and a payload; and
   wherein the member obtains the encrypted electronic content;
   the mediator of the mediator device further operative to:

receive a request, by the member, for mediation, comprising the mediator receiving a dispatch of the header of the encrypted electronic content from the member.

14. The mediator device of claim 13, wherein the mediator is further operative to:
   determine whether the member is eligible to decrypt the electronic content, if eligible, the mediator responding to the request for mediation with a member accessible header, wherein the member accessible header includes the header after application of $SK_{G2}$;
   wherein the member obtains a secret based on $SK_{G1}$ and the member accessible header; and
   wherein the member decrypts the payload of the electronic content using the secret.

15. The mediator device of claim 14, wherein the mediator is further operative to log requests by the member, eligibility determinations, and mediator responses.

16. The mediator device of claim 15, wherein logging comprises the mediator storing the requests by the member, eligibility determinations, and mediator responses at a device, wherein the device is accessible by the owner and others.

17. The mediator device of claim 15, wherein logging comprises the mediator dispatching alerts of the requests by the member, eligibility determinations, and mediator responses to the owner and others.

18. The mediator device of claim 14, wherein the mediator determining whether the member is eligible comprises the mediator being notified by the owner prior to the mediation request.

19. The mediator device of claim 14, wherein determining whether the member is eligible comprises the mediator being notified by the owner or another authority prior to the mediation request that the member's public key in invalid.

20. The mediator device of claim 13, wherein if the payload is greater than a threshold in size, the header includes a secret needed to decrypt the payload.

* * * * *